United States Patent [19]
Mauer et al.

[11] Patent Number: 5,369,964
[45] Date of Patent: Dec. 6, 1994

[54] AIR CONDITIONING APPARATUS

[76] Inventors: Georges Mauer, Rue Petit, 27000 Evreux; Bernard Simplex, 23 rue du Point du Jour, 27220 Saint Andre de l'Eure, both of France

[21] Appl. No.: 38,386

[22] Filed: Mar. 29, 1993

[30] Foreign Application Priority Data

Mar. 30, 1992 [FR] France ............... 92 03831

[51] Int. Cl.⁵ .................. F25D 3/02; F25D 11/00
[52] U.S. Cl. ........................ 62/420; 62/430; 62/404; 165/104.17
[58] Field of Search .............. 62/59, 406, 420, 430, 62/285; 165/902, 18, 104.17

[56] References Cited

U.S. PATENT DOCUMENTS

| | | | |
|---|---|---|---|
| 1,954,455 | 1/1934 | Morse et al. | 257/9 |
| 2,875,595 | 3/1959 | Kleist | 62/406 |
| 3,719,059 | 3/1973 | Cavis | 62/285 |
| 3,845,638 | 11/1974 | Apple, Jr. et al. | 62/406 X |
| 4,151,726 | 5/1979 | Schlueter | 62/285 |
| 4,217,877 | 8/1980 | Uhlyarik | 126/99 |
| 4,579,170 | 4/1986 | Moses et al. | 165/104.17 |
| 4,671,077 | 6/1987 | Paradis | 62/59 |
| 4,738,121 | 4/1988 | Crabb, Jr. | 62/347 |
| 4,922,998 | 5/1990 | Carr | 165/10 |
| 5,005,368 | 4/1991 | MacCracken et al. | 62/139 |
| 5,054,540 | 10/1991 | Carr | 165/10 |
| 5,165,466 | 11/1992 | Arbabian | 165/902 X |
| 5,201,024 | 4/1993 | Steffes | 165/18 X |

FOREIGN PATENT DOCUMENTS

| | | | |
|---|---|---|---|
| 0049174 | 4/1982 | European Pat. Off. | |
| 0449783 | 6/1992 | European Pat. Off. | F28D 9/00 |
| 0016133 | 1/1983 | Japan | 62/59 |
| 0232440 | 11/1985 | Japan | 62/430 |
| WO9117403 | 11/1992 | WIPO | F24D 20/00 |

OTHER PUBLICATIONS

Search report of French INPI on parent application dated 18 Nov. 1992 (in the French language).

*Primary Examiner*—Christopher Kilner

[57] ABSTRACT

Apparatus for cooling a fluid. The apparatus has an ice storage reservoir (5) and tubes (12, 9) by which a cooling fluid or a cooled fluid may pass through the reservoir (5), where the fluids may exchange heat with the ice. At least one and preferably both of the fluids are air. The fluids may circulate in the storage reservoir (5) either independently or alternately, in which case the same fluid can alternately function as the cooling fluid and the cooled fluid. The apparatus is consequently simplified and therefore more reliable.

15 Claims, 5 Drawing Sheets

AIR CONDITIONING APPARATUS

BACKGROUND OF THE INVENTION

The present invention relates to an apparatus for cooling a fluid that comprises
an ice storage reservoir,
means for circulating a cooling fluid within the reservoir where it can exchange heat with the ice, and
means for circulating a fluid to be cooled within the reservoir where it can exchange heat with the ice.

It also relates to an ice storage reservoir which is such that it can be a part of such an apparatus, as well as to banks of tubes or groups of tube banks for heat exchange that can be part of the reservoir so as to ensure the transfer of heat between the cooling fluid or the cooled fluid, on the one hand, and the ice, on the other hand.

Recently, apparatus for cooling fluid have been introduced that comprise an ice storage reservoir for cooling purposes in air treatment installations as, for example, air conditioning, in which the air to be treated notably passes through a heat exchanger, called a "chiller," for exchange of heat with an antifreeze liquid such as glycolated water that is at a temperature less than ambient and circulated for this purpose by a pump between the chiller and the ice storage reservoir. The antifreeze liquid flows in the reservoir so as to be cooled by direct heat transfer with the ice, freely or in a manner guided by baffles. The antifreeze liquid here constitutes the fluid to be cooled by heat exchange with the ice in the reservoir.

Naturally, the ice first has to be frozen, then refrozen again in the reservoir as the ice melts as a result of heat exchange with the fluid to be cooled. For this purpose, one can use two ice making methods, in both cases by means of the flow of a cooled fluid in the reservoir.

A first ice making method uses the direct expansion of an appropriate refrigerant, such as Freon ®, as the cooling fluid contained in a closed flow loop that passes through the reservoir and also contains, besides the reservoir, other components of a traditional refrigeration system such as a compressor, a condenser and an expansion device.

A second method uses as the cooling fluid the cooled fluid itself, namely the antifreeze liquid itself such as glycolated water, which fluid, outside the reservoir, flows through a heat exchanger where it is cooled by an evaporating refrigerant, such as Freon ®, supplied by a closed loop refrigeration system that also, as is usual, contains a compressor, a condenser and an expansion device. The chilled fluid then returns to the ice storage reservoir where it cools the water to make ice.

The incorporation of an ice storage reservoir into a fluid cooling apparatus is of particular interest in terms of energy cost savings since it offers the possibility of making and storing the ice during periods of the day or week, called "off-peak hours," during which the energy required for this purpose, usually the electric power that operates the compressor of the refrigeration system, is the least expensive. It is thus possible to meet the maximum cooling load during the other periods of the day or of the week, that is, to avoid, to the extent possible, operating the compressor and consequently using electrical power, during those other periods of the day or the week during which, at the same time, energy costs are the highest and the need for cooling in general is greatest. The cooling capacity that is then required to supply the chiller of the associated air conditioning installation is, for the most part, supplied by heat exchange with the cooling fluid, that is, the antifreeze liquid such as glycolated water, with the ice being produced and stored between times. Naturally, even during those periods, the refrigeration system can be operated to provide additional cooling capacity if the need requires.

However, in their currently known embodiments, fluid cooling systems having an ice storage reservoir have a number of shortcomings.

Using glycolated water or other antifreeze liquids as the coolant in the ice storage reservoir and, possibly, as the cooling fluid for making ice, presents disadvantages inherent in using any liquid, that is, the need for appropriate leakproof piping systems to interconnect, for example, the chiller of the air treatment apparatus with flow control and safety valves and with other parts of the flow loop as well as complex and expensive control and regulation devices. One may need to periodically replenish the entire system as well as to maintain the proportion of antifreeze in the liquid. Certain repair or maintenance operations require draining and refilling the system, which procedures require large labor expenditure as well as extended periods during which the refrigeration apparatus is shut down because of malfunction or for preventive maintenance. In addition, the consequences of a possible leak of glycolated water or other antifreeze liquid, such as soiling of and damage to the areas adjacent to the apparatus, are considerable.

When one also uses as the cooling fluid intended for making ice a fluid that is initially liquid and vaporized in piping that is intended to be immersed essentially continuously in the ice within the storage reservoir, it is necessary to take numerous precautions to avoid any leak in this piping, given the danger represented by refrigerants such as Freon ® that refrigerate by expansion and evaporation. In addition, in practice, using expansion and evaporation systems presents difficulties, notably because of the risks of retention of the compressor lubricating oil in other parts of the system, where the oil then remains and gradually accumulates, degrading system operation.

When the cooling fluid itself is an antifreeze liquid such as glycolated water and is used as the cooling fluid intended for making the ice in the storage reservoir, the known refrigeration apparatus also have the drawback of an increased requirement for space due the increased number and individual size of the necessary components.

European Patent Application 0 441 553 [U.S. Pat. No. 5,005,368 issued 9 Apr. 1991 to MacCracken et al.] recently proposed an air conditioning apparatus in which the air to be conditioned itself circulates, as the fluid to be cooled, inside the ice storage reservoir, where it is placed in a direct thermal exchange relationship with the ice. The ice is made in the storage reservoir through the direct expansion of an appropriate fluid which changes from a liquid to a gas during this expansion. The circulation of the air to be conditioned itself inside the storage reservoir as the fluid to be cooled, and the production of the ice through a direct expansion eliminate the drawbacks inherent in the use of an antifreeze liquid such as glycolated water but the drawbacks inherent in the production of cold through direct expansion still remain.

SUMMARY OF THE INVENTION

The object of the present invention is to correct in part and completely, if possible, the drawbacks of the prior art. For this purpose, the present invention proposes a fluid cooling apparatus of the type indicated above, in which the fluid to be cooled is a gaseous fluid as it was already known from European Patent 0 441 553 and which is characterized in that at least one and preferably both of the fluids, the cooling fluid and the cooled fluid, are air.

A "gaseous" fluid means here a fluid that remains in a gaseous condition under all those conditions of temperature and of pressure to which the fluid, i.e. either the cooling fluid or the fluid to be cooled, respectively, can be subjected at least when it passes through the storage reservoir. The gaseous fluid in question can be any gas or gaseous mixture meeting this condition, it being understood that a gas or gaseous mixture which is not dangerous even in the event of a damage, such as an inert gas or air, is preferred. As far as possible, at least one and preferably both of the fluids, the cooling fluid and the cooled fluid, respectively are air.

The consequences of an air leak are naturally much less severe, in most cases, than those of a leak of an antifreeze liquid, such as glycolated water or a refrigerant such as Freon ®, so that a fluid cooling apparatus according to the invention can offer a much greater level of safety than that provided by currently known cooling apparatus. Naturally, the use of air as the cooling fluid and as the fluid to be cooled is preferred when the cooling apparatus works in the free air, because filling the flow loops with air, or purging and refilling in case of a break in an air flow loop, is unnecessary. Air requires no antifreeze, resulting in considerable simplification of and reduction in time required for maintenance. In addition, control devices for gas and especially air systems are at once much simpler, much more reliable and much less costly than those used in liquid systems, in general, whether one considers the devices that actively produce the flow of fluid, that is, fans in the case of gaseous fluids such as air or pumps in the case of liquid, or whether one considers the devices that passively control the output, that is, registers or dampers in the case of gaseous fluids and air or valves in the case of liquid. The same applies to the connections between different parts of the circuit, which are much easier to make leakproof.

An apparatus made according to the invention is thus simple, economical and compact, while at the same time offering increased safety and convenience of maintenance.

In addition, an apparatus made according to the invention has optimal efficiency, whether in terms of heat transfer between the cooling fluid and the ice or in terms of heat transfer between the ice and the cooled fluid, with all of the transfers occurring entirely within the storage reservoir, that is, without loss of capacity other than normal ambient losses through the walls of the reservoir.

Depending on the situation, the present invention can include means to circulate, independently of each other within the storage reservoir, the cooling fluid and the cooled fluid, so that the fluids can then be different, although it is preferred that both be air. It can also include means for circulating, alternately within the reservoir, the cooling fluid and the cooled fluid, which must then be compatible with and preferably identical to each other.

An apparatus according to the invention, in which the cooling fluid and the cooled fluid flow independently of each other within the reservoir, that is, move in closed loops that do not allow mixing between the two fluids, even if the fluids are of the same type, presents the advantage of making the production of ice in the reservoir, by transfer of heat to the cooling fluid, independent from cooling the cooled fluid by transfer of heat to the ice. This capability offers great operating flexibility since ice making and fluid cooling can occur simultaneously instead of being controlled according to the time of day or day of the week, for example, in case the need for cooling outside off-peak hours temporarily exceeds the cooling capacity of the storage reservoir. In addition, the apparatus of the present invention is particularly well suited for use in an air conditioning system where one can directly use air to be conditioned as the cooled fluid, passing it through the ice storage reservoir in a specific flow path, while the cooling fluid can also be air, preferably dehumidified and circulating in a closed loop. The moisture that the air being conditioned may contain, in amounts that may vary within a broad range, nevertheless presents no real difficulty even if it does condense. Nevertheless, means are provided for removing any condensate that may form in the cooled air within the reservoir.

In a particularly simple, economic and effective way, the separate flow paths of the cooling fluid and the cooled fluid within the storage reservoir comprise at least one group of at least two banks of flat tubes, positioned next to each other and passing through the reservoir, defining within the reservoir at least one space for ice storage, and respectively, one for the cooling fluid and one for the cooled fluid. In this manner, there is a particularly compact and effective arrangement for exchange of heat between the ice, on the one hand, and the cooling fluid and the cooled fluid on the other hand, especially if the cooling fluid tube banks and the cooled fluid tube banks cross or have the same orientation and the two fluids pass through the banks in opposite directions.

Advantageously, the flat tubular banks fully cover one another and define the ice storage space or each ice storage space, respectively, through a free wall of one of them.

To the extent possible, one avoids the formation and freezing of condensate in the cooled fluid during its passage through its tube bank in the reservoir. This is particularly important, in the case of air from a room that may possibly vary over a broad range of relative humidity, if one takes the precaution of placing the flat tube banks, in that group, so that a flat tube bank for the cooling fluid is positioned between a flat tube bank for the cooled fluid and an ice storage space. In addition, this arrangement enhances heat exchange between the cooling fluid and the ice, certainly to the detriment of the exchange of heat between the ice and the cooled fluid, although this does not involve truly harmful consequences because one generally does not try to bring the temperature of this cooled fluid to a temperature as low as that of the ice.

Along the wall of the reservoir, one can maintain this condition by means of a group of the first type, comprising only two flat tube banks, with one tube bank for the cooling fluid, laced in direct contact with the ice storage space, and one bank or the cooled fluid, positioned next to a wall, preferably with thermal insulation, of the reservoir. One can obtain, in a particularly simple and economic way, such a group of two flat tube banks in the form of three flat walls, which are parallel to each other, with the fourth tube wall being a wall of the reservoir, and which are connected to each other by partitions that are parallel to each other and defining the banks for the cooling fluid and for the cooled fluid, between the walls. In the case of a group dissociated from a wall of the reservoir, one preserves this condition by providing, according to a second type, a group comprising a flat tube bank for the cooled fluid, positioned between two flat tube banks for the cooling fluid. One can obtain, in a particularly simple and economic manner, such a group of three flat tube banks in the form of four flat walls that are parallel to each other and connected to each other by partitions that are parallel to each other and that define the tube banks for the cooling fluid and for the cooled fluid, between the walls. Naturally, in this case also, it is preferred to orient the flat tube banks for the cooled fluid in a cross pattern, for example, at an angle of 90°, with respect to the two flat tube banks for the cooling fluid, or to orient the three flat tube banks identically and to cause the flow of the cooled fluid to be counter to the flow of the cooling fluid.

Depending on the situation, one can provide the reservoir with only one group of banks, notably of the second type, for example, according to the plane of symmetry of the reservoir, between two ice storage spaces or between two of the groups, notably of the first type, along the two parallel walls of the reservoir and respectively on both sides of a single ice storage space, which is suitable for particularly narrow reservoirs along a direction perpendicular to the flat tube banks.

However, if there is sufficient space for the reservoir perpendicular to the flat tube bank, it is preferable to provide a number of the groups in the same ice storage reservoir, notably two groups of the first type of tube banks and one or more groups of the second type of tube banks, placed parallel to each other so that all the banks for the cooling fluid have the same orientation and all the banks for the cooled fluid also have the same orientation, preferably in a cross pattern with respect to that of the banks for the cooling fluid, in which case the banks for the cooling fluid are connected to each other by means for collecting cooling fluid and the banks for the cooled fluid are connected to each other by means for the collecting cooled fluid.

Naturally, to the extent that an ice storage reservoir intended for use in an apparatus for cooling a fluid according to the invention, as well as the group of at least one, of tube banks for heat exchange placed inside this reservoir to ensure that the heat exchange between the ice and both the cooling fluid and the cooled fluid has the requisite novelty, the reservoir of the present invention also preferably comprises means for removing condensate from the tube banks, especially the banks for the cooled fluid, as well from such a group of tube banks.

As indicated above, when an apparatus according to the invention comprises means for causing the cooling fluid and the cooled fluid to circulate in the reservoir independently of each other, these means preferably comprise a closed flow loop for the cooling fluid. In practice, these means can advantageously comprise, outside the reservoir, a cooling fluid flow loop that is connected to the cooling fluid tube bank or banks and can comprise a heat exchanger between the cooling fluid and a refrigerant as well as a fan for circulating the cooling fluid, placed upstream from the chiller with reference to the direction of flow of cooling fluid. The chiller is then preferably placed directly upstream from the cooling fluid tube bank or banks, with reference to the direction of flow of the cooling fluid. This arrangement of the chiller and the ice storage reservoir offers optimum heat transfer performance in the production of ice.

Such a circulation of cooling fluid in a closed flow loop, independent of the circulation of the cooled fluid and notably without the introduction of the cooled fluid into this closed flow loop even if the cooling fluid and the cooled fluid are the same substance, such as, for example, air, permits controlling the humidity of the cooling fluid so as reduce the risk of condensation and freezing in the cooling fluid flow loop, notably in the chiller, whatever the humidity of the cooled fluid. That humidity can vary within a broad range and sometimes be high, either in air removed from a room or in outside air to be supplied to the room, either in an installation for air cooling alone or in an air conditioning installation that also has the capability for heating. The risk of any condensate in the cooled fluid becoming frozen is very low because the cooled fluid does not pass through the chiller. Any condensate that is formed can be removed by appropriate means associated with the cooled fluid tube bank or banks, notably at the corresponding collecting means.

An apparatus according to the invention in which means are provided for causing alternate flow, in the reservoir, of the cooling fluid and the cooled fluid, with both advantageously being air, is particularly suitable if the task is not only to refrigerate this air but also to dehumidify it by condensing the moisture entrained in it. The reservoir is then equipped with appropriate means for removing condensate from the cooled fluid.

This means for causing alternate flow, in the ice storage reservoir, of the cooling fluid and the cooled fluid advantageously comprises at least one flat tube bank that passes through the reservoir and defines in the reservoir at least one space for the production and storage of ice and means for causing the circulation, alternatively, of the cooling fluid or the cooled fluid in the tube bank, which bank can advantageously be defined in a particularly simple and economic manner by two flat walls that are parallel to each other and connected to each other by partitions that are parallel to each other. The present invention also applies to such a tube bank and to a reservoir that has been equipped in that manner.

The flat tube bank in which one or the other of the fluids, cooling or cooled, is/are caused to alternately flow can be single. It is preferably then placed in a central position in the reservoir so as to define in it two spaces for the production and storage of ice, that is, so that it is surrounded by ice or it can be provided in a number of units, placed parallel to each other so as to present the same orientation and to delimit two spaces for the production and storage of ice, with the several banks then being connected to each other by collecting means.

To the extent that at least one of the fluids, either cooling or cooled, contains moisture that will condense as it passes through the ice storage reservoir via the tube bank or banks, the reservoir preferably has means for the removal of condensate formed in the bank or banks.

In this variant, the apparatus according to the invention is particularly well suited for use as an apparatus for cooling and dehumidifying a fluid such as air recirculating from a room or taken from the outside to be supplied into a room. The apparatus is also suitable for use in conjunction with or as a part of a machine that must operate in a controlled humidity environment, for example, in certain machines in the textile and the electronics components manufacturing industries. For this purpose, the means for causing flow, alternately in the tube banks or banks, of the cooling fluid and the cooled fluid comprise, external to the reservoir, a principal duct for a single fluid, that is alternately both the cooling fluid and the cooled fluid, that flows through the principal duct in a predetermined direction. That principal duct contains a chiller for exchange of heat between the single fluid and a refrigerant, as well as a fan for circulating the single fluid placed upstream, with respect to the same predetermined direction, from the chiller and discharging through it. A bypass duct that includes the tube bank or banks of the storage reservoir opens into the principal duct both through a first opening located upstream from the circulating fan and through a second opening located downstream from the chiller, both with reference to the same direction. There is a communicating passage between the bypass duct and the second opening in the principal duct. The passage connects with the bypass duct in a zone of that duct that is between the tube bank or banks of the bypass duct and the second opening and with the principal duct in a region of that duct that is located between the first opening (into the bypass duct) and the circulating fan. There is a first means for closing the principal duct located between the communicating passage and the first opening into the bypass duct, a second means for closing the principal duct located downstream from the second opening into the bypass duct, a third means for closing located in the second opening into the bypass duct and a fourth means for closing located in the communicating passage.

One skilled in the art can easily understand that, under such conditions, the fan can cause, by closing the second and fourth means for closing and by opening the first and third means for closing, a recirculating flow of the single fluid through a loop that first passes from the fan through the chiller, then the tube bank or banks of the ice storage reservoir, and then returns to the fan, the single fluid thus functioning to produce ice in the reservoir. Also, by operating, to a varying degree, the first means for closing, completely shutting the third means for closing, while opening the second and, to a varying degree, the fourth means for closing, one can permit flow through the bypass duct, then through the tube bank or banks of the ice storage reservoir, where, during the passage of the fluid, the cooling capacity of the ice is used both to cool the fluid and to dehumidify, by condensation on the ice cold walls of the tube banks, before the fluid returns to the principal duct where the fan moves it toward the destination of its intended use, for example, a room or a machine to be supplied with cooled and dehumidified air. The condensate is removed from the bank or banks by the means described above. Finally, if the third and fourth means for closing are shut while the first and second means for closing are open, air flows only through the principal duct. Thus it flows toward its destination without passing through the bypass duct and consequently without undergoing any dehumidification, but possibly cooling, as it passes through the chiller.

Because of the utility of the applications described above to a fluid cooling apparatus according to the invention, the present invention also applies to such applications.

Other characteristics and advantages of the different aspects of the invention will become apparent from the below description of nonlimiting examples and from the attached drawings, which drawings are an integral part of the description.

DESCRIPTION OF THE PREFERRED EMBODIMENTS

Figures 1, 2, 3:
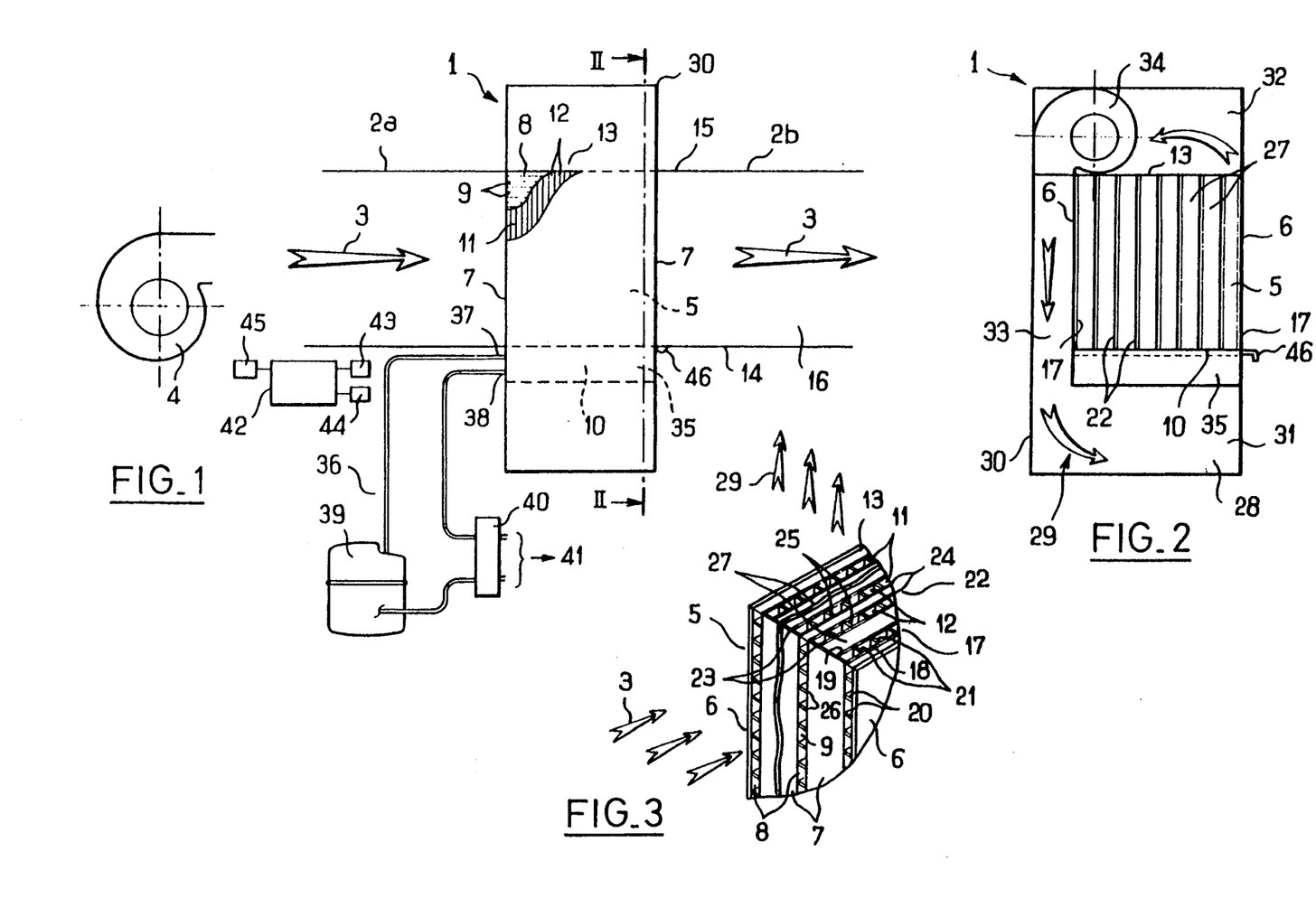
FIG. 1 is a schematic diagram, in an elevation view partially broken away, of an air conditioning system for the treatment of air comprising an apparatus according to the invention using an ice storage reservoir with mutually independent circulation of a gaseous cooling fluid and of the gaseous cooled fluid, both fluids, for example, being air.
FIG. 2 is a cross section of the installation through a plane identified by II—II in FIG. 1.
FIG. 3 is a partial perspective view of the groups of flat tube banks provided in the ice storage reservoir for the mutually independent circulation of the cooling fluid and the cooled fluid.

Referring first to FIGS. 1 through 3, those drawings illustrate cooling apparatus 1 according to the invention positioned between two sections 2a and 2b of, for example, a horizontal duct that conveys a flow of air in the direction indicated by arrow 3, also horizontal. The air arrives, as the fluid to be cooled, drawn through section 2a from the outdoors and/or from a room whose air one wishes to condition before returning it to the room, by means known to one skilled in the art, of which only one fan 4 is depicted. The air leaves apparatus 1 according to the invention after cooling through section 2b to be returned to the room in question.

During its passage between sections 2a and 2b, the air to be cooled passes, in this case horizontally, through and does not bypass ice storage reservoir 5, a preferred embodiment of which will now be described with reference to FIG. 3.

Ice storage reservoir 5 takes the general form of a rectangular parallelepiped defined, if one uses as a reference direction 3, horizontal in this case, by:

two flat lateral walls 6 that are parallel to each other and oriented longitudinally and vertically, with lateral walls 6 being continuous and watertight;

two flat front walls 7 that are parallel to each other and vertical but transverse, connecting lateral walls 6 respectively on the opposite side of section 2a and on the opposite side of section 2b, with two front walls 7 being watertight and watertightly joined to two lateral walls 6, but having locally, along several vertical alignments distributed regularly between lateral walls 6, openings of respective flat tube banks 8, parallel to each other, with each bank being formed by vertically aligned longitudinally rectilinear and horizontal tubes 9, with each tube thus opening into both of walls 7, towards section 2a and towards section 2b, respectively;

flat, longitudinal, horizontal and watertight bottom wall 10, watertightly joined to two lateral walls 6 and also to two front walls 7, with bottom wall 10 having, along longitudinal alignments that are regularly distributed between lateral walls 6, the open ends of flat tube banks 11, each parallel to another and each formed by the longitudinal arrangement of a number of vertical tubes 12, with the bottom end of the bank opening into bottom wall 10 and the upper end of the bank opening into upper wall 13 of reservoir 5, which wall 13 is horizontal and defines the top of lateral walls 6 and front walls 7.

Each of flat tube banks 8 and 11 extends from one of front walls 7 to the other and from bottom wall 10 to top wall 13 of reservoir 5, without discontinuity.

Bottom wall 10 and top wall 13 of storage reservoir 5, respectively, are at the same heights as horizontal lower wall 14 and horizontal upper wall 15 of duct sections 2a and 2b, which are incidentally delimited by two respective vertical lateral walls 16 extending longitudinally to lateral walls 6 of reservoir 5, with section 2a, section 2b and reservoir 5 all having identical rectangular, possibly square, cross sections.

Note that flat tube bank 8 and flat tube bank 11, one horizontal and the other vertical, are not only mutually parallel but also parallel to lateral wall 6 of reservoir 5.

Preferably, as illustrated, banks 8 and 11 are grouped together, but in a different manner depending on whether they are located adjacent to one of lateral walls 6 of reservoir 5 or whether they are located in an intermediate position between lateral walls 6, if one refers to the preferred embodiment illustrated in FIG. 3 and it being understood that other embodiments could be selected without leaving the scope of the present invention.

Referring to FIG. 3, along each of lateral walls 6 of reservoir 5, is placed respectively group 17 of two flat tube banks 8 and 11. Tube bank 8, having tubes 9 that are oriented horizontally, is directly adjacent one lateral wall 6 and one tube bank 11, whose tubes 12 are oriented vertically, is directly adjacent tube bank 8, naturally in both cases between two lateral walls 6 of reservoir 5, that is, inside the walls. Preferably, each group 17 comprises the combination of three watertight flat walls that are parallel to each other, with the corresponding lateral wall 6 and two other walls 18, 19 located between lateral walls 6. Each of walls 18, 19 is watertightly joined to front wall 7 as well as to bottom wall 10 of reservoir 5. It also extends to top end 13 of the reservoir. Wall 18, located between wall 19 and lateral wall 6, is joined to the latter by a number of longitudinal, horizontal, flat partitions 20, that are also parallel to each other and are watertight, and that, taken two at a time with lateral walls 6 and 18, define the different tubes 9 of bank 8. Similarly, wall 19 is connected to wall 18 by a number of flat, transverse partitions 21 that are parallel partitions, vertical and watertight, and that, taken two at a time with walls 18 and 19, define the different tubes 12 of bank 11. Partitions 20 thus extend from one of front walls 7 of reservoir 5 to the other and partitions 21 extend from bottom wall 10 to top end 13 of reservoir 5.

Between two groups 17, associated with lateral walls 6 and thus each comprising one flat tube bank 8 and one flat tube bank 11, at least one group 22 of three tube banks is placed with two tube banks 11 surrounding tube bank 8 to which they are adjacent. In the example illustrated in FIG. 2, seven intermediate groups 22 have thus been provided, with this number naturally only being indicated as a nonlimiting example.

Each group 22 is defined by four flat walls that are parallel to each other, with two extreme walls 23 and two intermediate walls 24 that are watertight and extend longitudinally from one front wall 7 to the other, to which they are watertightly joined, and vertically from bottom wall 10, to which they are watertightly joined, to top end 13 of reservoir 5. Each of extreme walls 23 is connected to the corresponding closest intermediate wall 24 by a number of flat partitions 25, parallel to each other and directed in a transverse direction with respect to direction 3 and watertight and extending from bottom wall 10 to top of reservoir 5 to define between them, as well as between extreme wall 23 and associated intermediate wall 24, tubes 12 of a respective tube bank 11. Similarly, two intermediate walls 24 are linked to each other by a number of flat partitions 26 that are parallel to each other, longitudinal, more precisely horizontal, and watertightly joined to and extending from one front wall 7 to the other and defining between them, as well as between intermediate walls 24, different tubes 9 of tube bank 8.

The transverse spacing between walls 18 and 6, like the dimensional characteristics of partitions 20 and 26, are selected in such a manner that, considered as a whole, tubes 9 provide a sufficiently large transverse cross section for the passage of air from section 2a to section 2b, which function with respect to these tubes as an inlet plenum and outlet plenum, respectively, with air constituting the fluid to be cooled, by means of an apparatus according to the invention, in a manner that can easily be determined by one skilled in the art.

Similarly, the mutual transverse separation between walls 18 and 19 of each group 17 and that of each wall 23 of a group 22 with respect to the corresponding closest intermediate wall 24 are selected, jointly with the dimensions of partitions 21 and 25, in such a manner that group of tubes 12 offers a sufficient horizontal cross section for the passage of a cooling fluid that passes through reservoir 5 vertically through tube 12, in practice from bottom to top, passing through a closed circuit, which will now be described more particularly with reference to FIG. 2, to make, inside reservoir 5, the ice to which the fluid to be cooled, that is, the air that passes through duct sections 2a and 2b, can transfer heat as needed.

In order to ensure the storage of this ice, groups 22 are spaced transversely inside the storage reservoir with respect to each other, on the one hand, and, on the other hand, with respect to groups 17, for example, according to a uniform distribution along one horizontal transverse direction, in such a manner that between extreme walls 23 belonging to two groups 22 that are adjacent each other, and also between wall 19 of each group 17 and wall 23 of group 22 that is directly adjacent, and between front wall 7 of reservoir 5, above bottom wall 10 of the latter and up to end 13, there are spaces 27 that, upon putting apparatus 1 into service, can receive water that is to be frozen into ice, which in turn is caused to melt or to refreeze, successively, with the addition and removal of heat.

Note that in each one of groups 17 and 22, the tubes 9 that carry the fluid to be cooled, that is, air in the illustrated example, contact the ice only through the intervening tubes 12 that carry the cooling fluid and that directly contact ice storage spaces 27. It is understood that walls 18, 19, 23 and 24 are made of materials that offer good thermal conductivity to permit heat exchange not only between the cooling fluid and the ice but also between the ice and the cooled fluid. In contrast, lateral walls 6 of reservoir 5 are preferably thermally insulated.

Closed flow loop 28, through which the cooling fluid, here dehumidified air, flows in a direction indicated by arrow 29 and ascends inside tubes 12, is defined outside of reservoir 5 by transverse housing 30. Housing 30 is watertightly joined to reservoir 5 and comprises two plena 31 and 32 and a duct 33. Under bottom wall 10 is inlet plenum 31, above top 18 is outlet plenum 32. Along one of walls 6 of reservoir 5 is duct 33 linking the two plena, 31 and 32 respectively, to each other and through which the cooling fluid flows in a vertically descending direction.

Circulation fan 34 causes the circulation of the fluid inside closed flow loop 28 in direction 29. Fan 34 is housed in and takes its suction from outlet plenum 32 and discharges into conduit 33 towards inlet plenum 31.

Chiller 35 is located inside inlet plenum 31, immediately below bottom wall 10 of reservoir 5 and over the entire extent of bottom wall 10 immediately upstream, with reference to direction 29, from tubes 12 of banks 11. In the chiller, heat is exchanged between the cooling fluid, before its penetration into tubes 12 of banks 11, and a refrigerant supplied to chiller 35 by refrigeration apparatus 36, which is outside reservoir 5 and closed flow loop 28. Apparatus 36 comprises successively, from refrigerant outlet 37 of chiller 35 to refrigerant inlet 38 of chiller 35, compressor 39 and condenser 40 linked to circuit 41 for the extraction of heat energy in a manner known to one skilled in the art.

Fans 4 and 34 as well as refrigeration apparatus 36 are controlled, for example, automatically as a function of a program stored in the memory of controller 42 that is responsive to sensors 43 such as a temperature sensor in the room to be cooled, as well as by timer 45, and/or by means of manual control 44, for example, according to the cycle described below.

Fans 4 and 34 as well as compressor 39 of refrigeration apparatus 36 are assumed to operate electrically, supplied with power at a preferential price at certain hours of the night or the week or during off-peak hours and at the normal, higher, price outside those off-peak hours. Ice is made in storage reservoir 5 in order to accumulate cooling capacity during off-peak hours. For this purpose, fan 4 is deenergized and refrigeration apparatus 36 as well as fan 34 are operated so that air, cooled as it passes through chiller 35, flows through the various tubes 12 from the bottom to the top where the air removes heat from the water present in spaces 27 and freezes the water into ice.

During other than off-peak hours, compressor 39 is normally deenergized and fan 4 is operated, at either a constant or variable speed, in a manner determined by the function of the need to move air to be cooled through reservoir 5 via tubes 9, through which tubes the flow is in longitudinal direction 3, and to cool the air as it passes through the reservoir by heat exchange with the ice present in spaces 27 through the intermediation of cooling air, that circulates all the time in tubes 12 through the action of fan 34, before returning it in a cooled condition to the room. Advantageously, fan 34 is of the variable speed type, to allow a variation in the heat transfer between the cooled air and the ice, along with the stabilization of the temperature of this air, at its exit from storage reservoir 5, as a function of the cooling capacity of the reservoir. In case the demand for cooling in the room or in the machine served exceeds the cooling capacity of reservoir 5, powered supplemental cooling can be provided by again starting compressor 39.

Naturally, different designs of reservoir 5 could also be suitable for such an operation. A nonlimiting example of such a design has been illustrated in FIG. 8.

The same numerical references as used in FIGS. 1 through 3 have been used to designate those components in FIG. 8 that are identical to those described with reference to FIGS. 1 through 3; references incremented by 100 in comparison to the references used in FIGS. 1 through 3 and used to designate components that while corresponding to components described with reference to FIGS. 1 through 3, have, to various degrees, different configurations.

Figure 8:
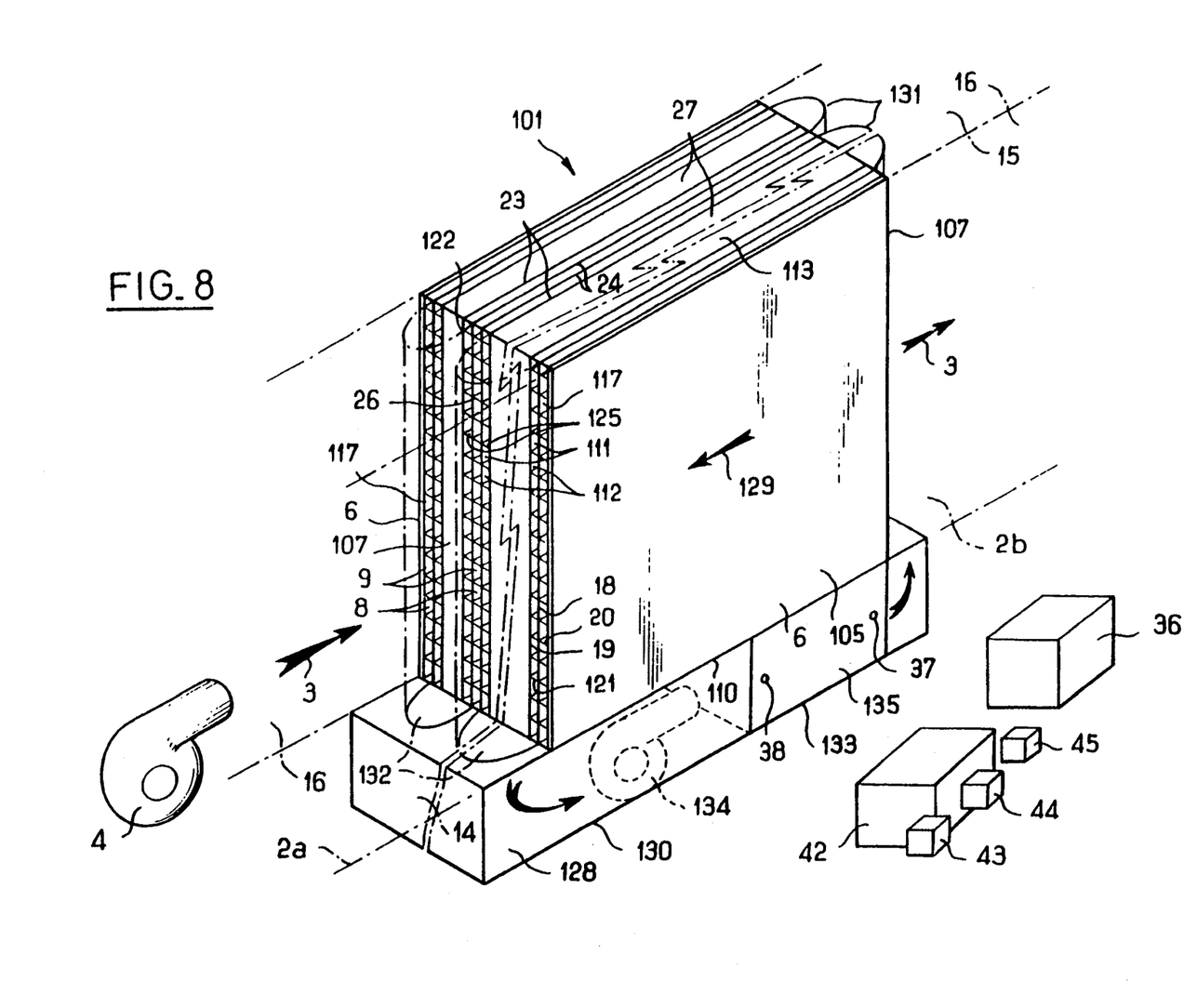
FIG. 8 illustrates, in a perspective view, a variant embodiment of the groups of flat tube banks illustrated in FIG. 3, capable of ensuring, inside the ice storage reservoir, the mutually independent circulation of the gaseous cooling fluid and the gaseous cooled fluid, with both fluids being, for example, air, in a heat exchange relationship with the ice.

Thus, in FIG. 8, reference numerals 101, 2a, 2b, 3, 4, 105, 6, 107, 8, 9, 110, 111, 112, 113, 14, 15, 16, 117, 18, 19, 20, 121, 122, 23, 24, 125, 26, 27, 128, 129, 130, 131, 132, 133, 134, 135, 36, 37, 38, 42, 43, 44, and 45 designate components that correspond to the components designated by numerical references 1 through 38 and 42 through 45 in FIGS. 1 through 3.

The differences between refrigeration apparatus 101, illustrated in FIG. 8, and refrigeration apparatus 1, illustrated in FIGS. 1 through 3, are essentially the result of differences between ice storage reservoir 105 illustrated in FIG. 8 and ice storage reservoir 5 illustrated in FIGS. 1 through 3.

In reservoir 105, partitions 121 and 125, instead of being vertical like partitions 21 and 25, are horizontal, so that in each group 117 and 122, tubes 112 of bank 111 or banks 111 themselves are horizontal and do not open into bottom wall 110 of reservoir 105, which wall therefore has no openings, nor do they open into top 113 of reservoir 105. The tubes are then made watertight above each of groups 117 and 122, opening into front walls 107 of reservoir 105 that then are not watertight except for ice storage spaces 27.

Consequently, tubes 112 of flat tube banks 111 carry the cooling fluid horizontally inside reservoir 105.

Preferably, this flow is counter to the flow of the cooled fluid, that is, in horizontal direction 129 opposite direction 3.

For this purpose, on front side 107 and turned downstream with reference to direction 3, are located cooling fluid inlet headers 131, each header having the form of a vertical channel, closed at its upper end and opening at its lower end into horizontal duct 133, which duct is defined by housing 130, adjacent wall 110 of reservoir 105 and at a position that is very close to lower wall 14 of duct sections 2a and 2b. In the illustrated example, each header 131 spans a respective ice storage space 27 so as to form a watertight passage into those tubes 112 of banks 111 that are immediately adjacent the header, naturally leaving free communication between banks 8 and section 2a. But one could also produce other embodiments, according to which, for example, a header would be provided for each respective bank 111. Similarly, on front side 107 of reservoir 105 and turned upstream with reference to direction 3, are located outlet headers 132. Each header 132 is in the form of a vertical channel that is identical to the channels forming inlet headers 131. Notably, like the latter, the channels are closed at the top while they open at the bottom into duct 133. Like the channels of inlet headers 131, these channels do not impede the communication between banks 8 and section 2a, and are respectively shared by two banks 111 arranged on each side of a same ice storage space 27 in the illustrated example but, like the channels that form inlet headers 131, they could be of different design.

Housing 130, through duct 133, along with inlet 131 and outlet headers 132 and banks 111, thus define closed flow path 128 through which air is cooled as it passes through chiller 135, exactly similar to chiller 35 but located inside housing 130, under the action of circulation fan 134 that is exactly similar to circulation fan 34 but located inside housing 130.

Note that tubes 9, through which a cooled fluid such as air flows, are not placed in direct contact with the ice located in ice storage spaces 27. Instead the tubes are to some extent thermally insulated from this ice by tubes 12 or 112 through which the cooling air passes at the same time that cooled air passes through tubes 9. This avoids, to a large extent, the condensation of any water vapor contained in the cooled air as well as the losses of system cooling capacity that would result. The condensation should be sufficiently low as to remain entrained in the cooled air flow. However, it may be preferable, as shown schematically in FIGS. 1 and 2, to provide drain 46, immediately downstream from storage reservoir 5, with reference to direction 3, and in the cooled air flow path at bottom wall 10 of reservoir 5, or at bottom wall 110 of reservoir 105 in a manner that is not illustrated, which drain is approximately horizontal and extends from one lateral wall 6 of the reservoir to the other, that is, under the respective openings of all tubes 9 of all banks 8, to collect condensate and discharge it from storage reservoir 5, and from section 2b, into a suitable waste water disposal.

Because the cooling air itself moves in closed flow loop 28 or 128, one can limit its humidity so that there is no risk of condensation inside loop 28 or 128.

The designs of ice storage reservoir 5 or 105, just described with reference to FIGS. 1 through 3 and to FIG. 8, are thus particularly well suited for the case in which one wishes to avoid condensate formation in the air to be conditioned, but one can also design the ice reservoir of an apparatus according to the invention in such a manner that, on the contrary, any water vapor entrained in this air condenses in the air being conditioned in order to obtain a regulated dehumidification of the air. Thus, if the apparatus according to the invention, as described with reference to FIGS. 1 through 3 or to FIG. 8, is more particularly suited to the case in which the air to be cooled can contain variable quantities of humidity, as can occur in air removed from a room and to be returned to the room after cooling, simply to ensure the cooling of the room in question, apparatus according to the invention will now be described which is more particularly suited not only for cooling air but also for dehumidification by the formation of condensate in the ice storage reservoir.

Figure 4:
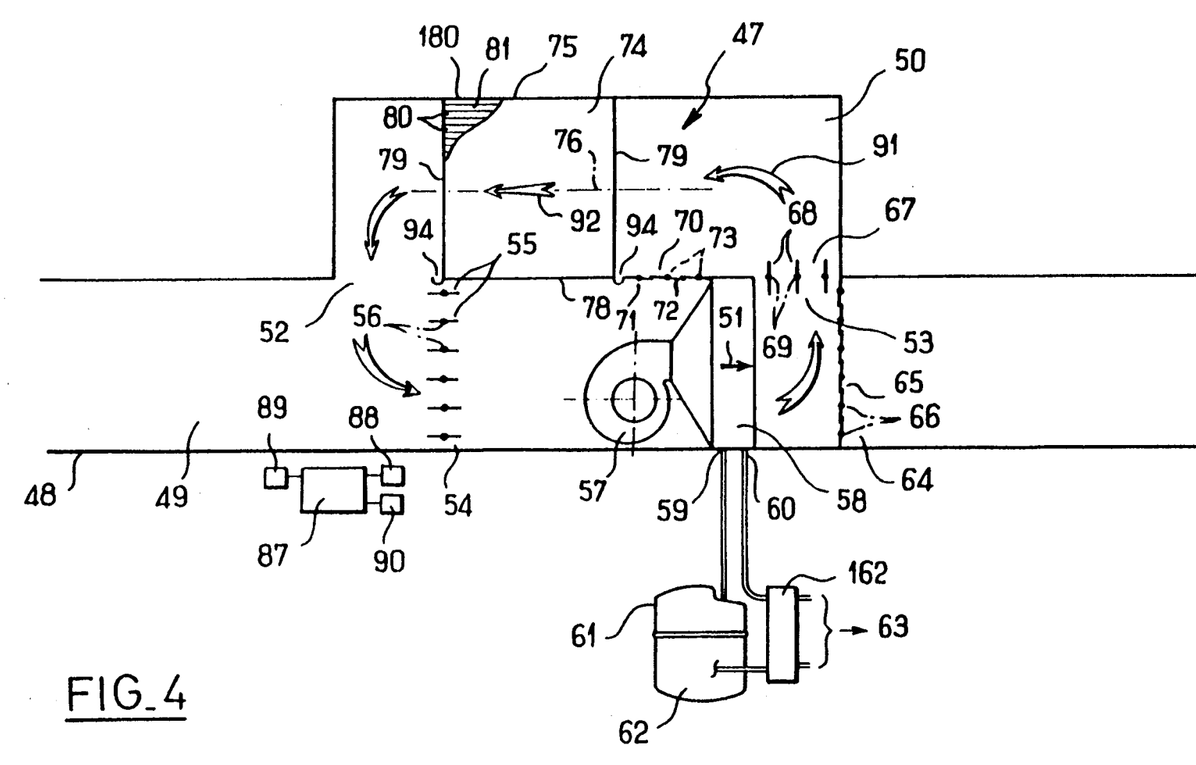
FIGS. 4, 5, and 6 are cross-sectional schematic views of the same installation for the treatment of a gaseous fluid such as air, by cooling and dehumidifying in three different states, corresponding to different phases of operation of this installation, with the fluid to be treated, such as air, alternately serving as the cooling fluid and the cooled fluid and passing through the same flat tube banks of the ice storage reservoir in one direction or in the other, depending on the operating mode.
Figure 5:
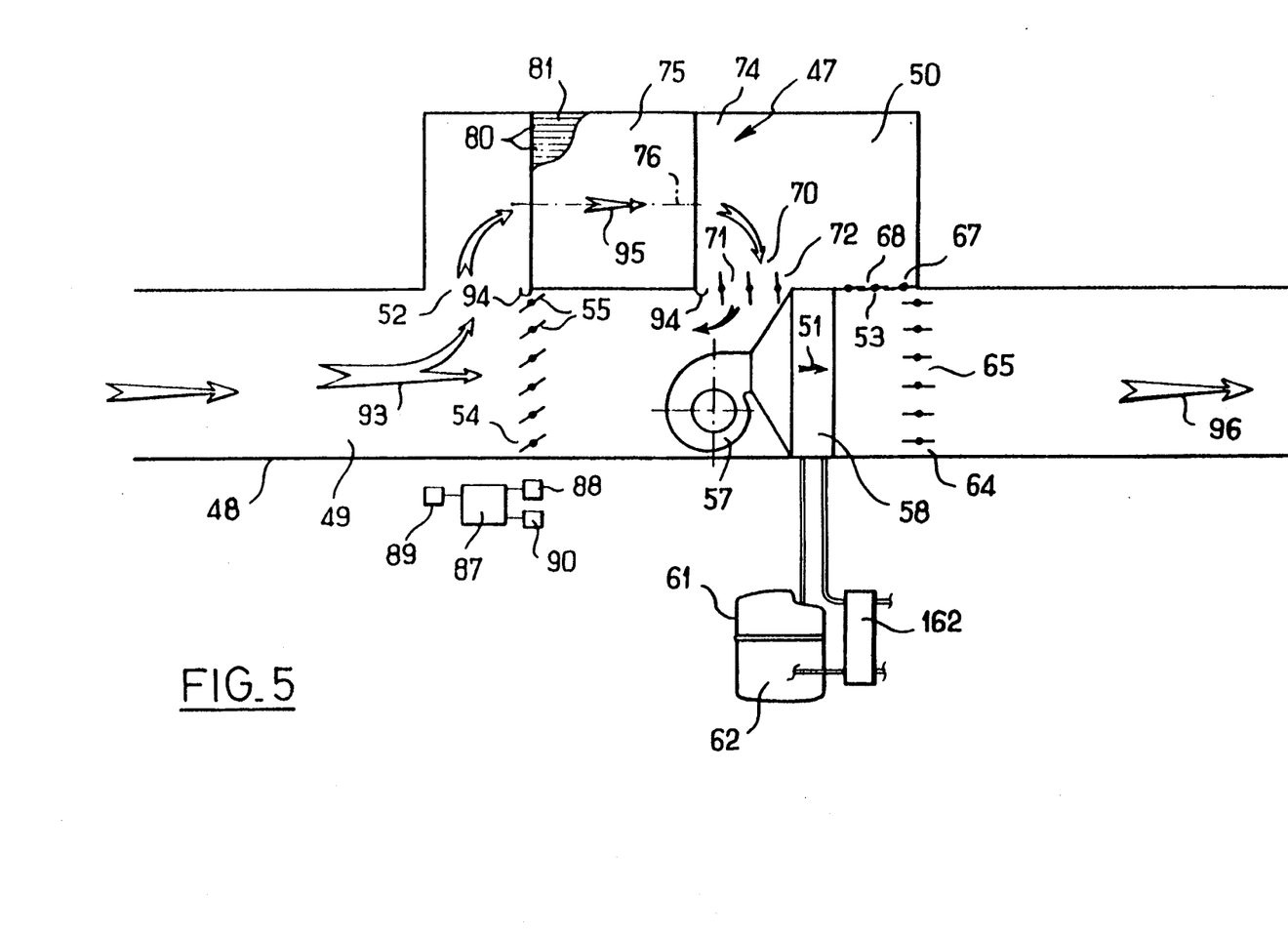
Figures 6, 7:
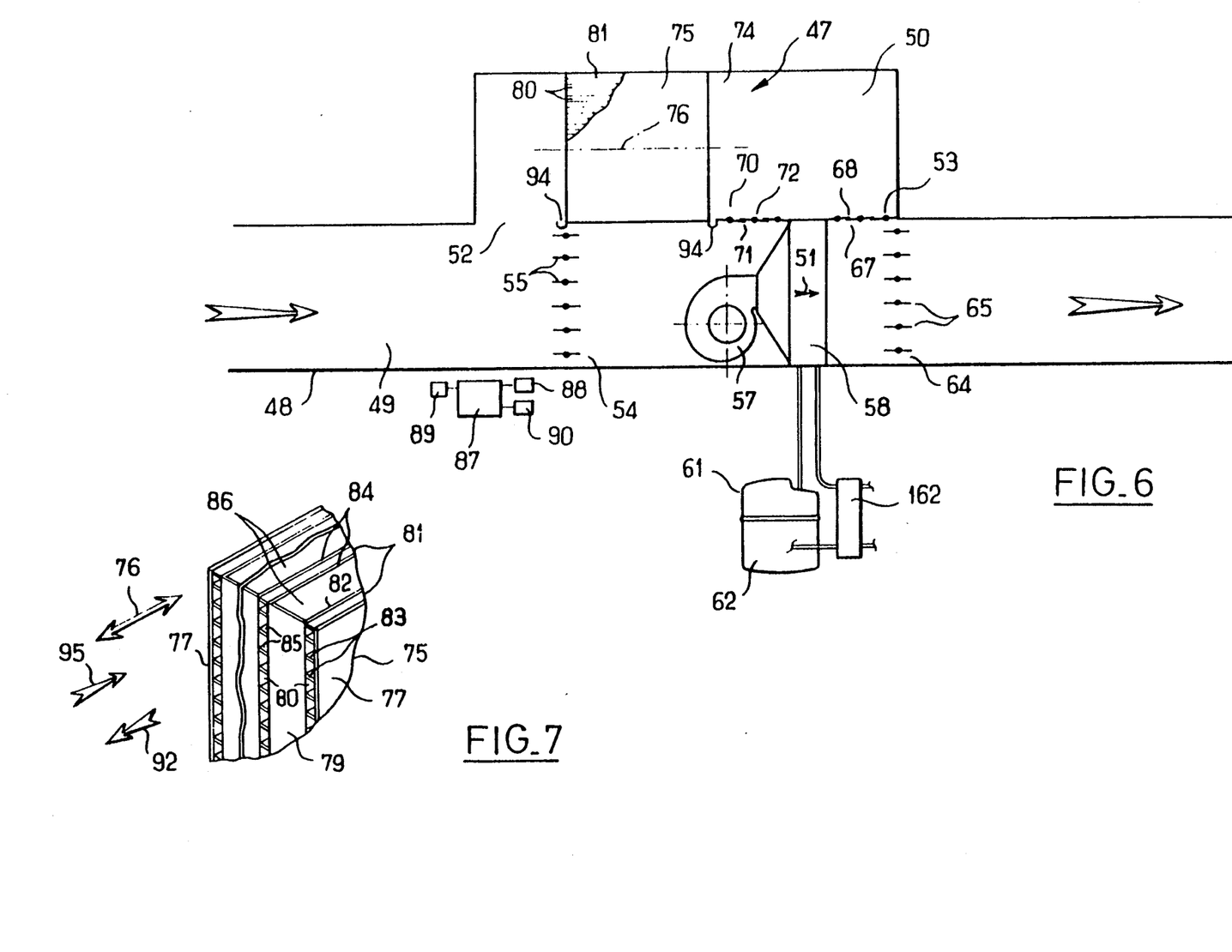
FIG. 7 shows a perspective view of the flat tube banks inside the ice storage reservoir of the above embodiment.

In FIGS. 4 through 6, the apparatus according to the invention is designated by number 47. The apparatus is partly housed inside duct 48, of which one portion is main duct 49 for air to be cooled and dehumidified, and partly in bypass duct 50 of duct 48 or main duct 49. Main duct 49 is intended for air flow in a direction 51 determined by the air to be cooled and dehumidified which comes from inside a room and/or from the outdoors and which is intended to be returned to the room or supplied to a machine after conditioning.

In direction 51, main duct 49 or duct 48 successively contains opening 52 upstream into bypass duct 50 and opening 53 downstream from bypass duct 50. Immediately downstream from opening 52, that is, upstream from opening 53, and inside duct 48 is interior closure control means 54 in the form, for example, of dampers 55 that can be controllably rotated, inside duct 48, around respective horizontal axes 56 between one position, illustrated in FIGS. 4 and 6, in which they are fully open, completely clearing the cross section of duct 48, to at least another position, illustrated in FIG. 5, in which they partially obstruct the cross section and, possibly, to a position, not illustrated, in which they completely close the duct.

Also with reference to direction 51, downstream from closure control means 54 and upstream from opening 53 to bypass duct 50, duct 48 contains fan 57, preferably of the variable speed type, to cause movement in the air to be cooled and dehumidified from upstream to downstream. Chiller 58 is aligned perpendicularly to direction 51 and occupies all of the cross section of duct 48 as well as of the discharge of fan 57 to ensure transfer of heat between, on the one hand, the air passing through it under the urging of fan 57 and, on the other hand, a refrigerant circulating through chiller 58. External to this, between refrigerant outlet 59 and refrigerant inlet 60, is refrigeration system 61 comprising compressor 62 and condenser 162, and also heat removal circuit 63, in a manner known to one skilled in the art. In addition, immediately downstream, with reference to direction 51, from opening 53 of bypass 50, duct 48 has closure control means 64 in main duct 49, which means 64 are, for example, like means 54, in the form of dampers 65 capable of controllably rotating about respective horizontal axes 66 between a position completely closing duct 48 and main duct 49, illustrated in FIG. 4, and a position in which the cross section of duct 48 is completely open for the passage of air from upstream to downstream, as illustrated in FIGS. 5 and 6.

In addition, closure control means 67 for regulating the closure of opening 53 into bypass duct 50 are provided, for example, in the form of dampers 68 that controllably rotate about axes 69, in this case horizontally, taking into consideration that bypass duct 50 is immediately above duct 48, between a position where the passage of air between bypass duct 50 and duct 48 through opening 53 is unrestricted, as shown in FIG. 4, and a position where the passage of air between bypass duct 50 and duct 48 or main duct 49 is completely prevented, as illustrated in FIGS. 5 and 6.

In addition, bypass duct 50 communicates with duct 48 and main duct 49 not only through upstream opening 52 and downstream opening 53, but also opens into duct 48 and main circuit 49 through auxiliary opening 70 immediately upstream, with reference to direction 51, from chiller 58 in a manner so as not to communicate with chiller 58 except through fan 57, that is, functionally between upstream opening 52 and the suction of fan 57. This auxiliary opening 70 is fitted, like opening 53, with closure means 71 that, in the illustrated example, is in the form of dampers 72 that can controllably rotate about horizontal axes 73 between a position in which they completely close opening 70, as shown in FIGS. 4 and 6, and a position in which opening 70 is clear, as shown in FIG. 7.

Between upstream opening 52 and auxiliary opening 70, bypass 50 has horizontal zone 70 through which the air to be cooled and dehumidified can travel horizontally, as will be seen below. Horizontal zone 74 preferably has a square cross section, fully taken up by ice storage reservoir 75, which will now be described with reference to FIG. 7.

If one takes, as the reference longitudinal direction, horizontal direction 76 of the air flow path in horizontal zone 74 of bypass 50 between upstream opening 52 and downstream opening 53 or auxiliary opening 70, which direction 76 is preferably parallel to direction 51 of flow in main circuit 49 for the air to be cooled and dehumidified, reservoir 75 is defined by two flat lateral walls 77 that are parallel to each other, vertical and longitudinal, thermally insulated and preferably defined by walls of bypass 50, as well as by bottom wall 78, also flat and longitudinal but horizontal, thermally insulated, and possibly preferably constituting a wall of delimitation between bypass duct 50 and duct 48 and main duct 49. The reservoir is also defined by two flat front walls 79 that are parallel to each other, vertical and more precisely transverse. Towards the top, storage reservoir 75 is closed by flat upper wall 180 that is longitudinal and horizontal, and preferably can be thermally insulated and can be a wall of bypass duct 50.

Walls 77, 78, and 79 are watertight and joined together in a watertight manner. Wall 180, also watertight, is watertightly joined only with lateral walls 77, but it leaves a vertical clearance with respect to front walls 79 so that reservoir 75 is open towards the top of the inside of bypass duct 50, in a manner not visible in the figures but easily conceived by one skilled in the art.

Like front walls 7 of reservoir 5, front walls 79 of reservoir 75 have, along vertical alignments that are preferably distributed regularly on each side of lateral walls 77, openings of longitudinal tubes 80 of respective flat tubular banks 81, which are simultaneously longitudinal and vertical, on the one hand extending vertically from bottom wall 78 of reservoir 75 to its upper wall 180 and, on the other hand, longitudinally from one of front walls 79 to the other.

Each of flat tube banks 81 preferably has a structure identical to that of one of corresponding flat tube banks 8 described in conjunction with FIG. 3.

In other words, two of these banks are positioned next to lateral walls 77 of storage reservoir 75 and are respectively defined by lateral wall 77 and by watertight flat wall 82 parallel to wall 77 and watertightly joined to walls 78, 79, and 80, as well as by horizontal, flat longitudinal partitions 83 that are watertight and joined to walls 77 and 82 to form tubes 80. Between these outer banks 81 are several intermediate banks 81, only one of which is illustrated in FIG. 7, with each of these intermediate banks 81 being defined by two watertight flat walls 84 that are parallel to each other and are longitudinal and vertical and are watertightly joined to each of walls 78 and 80, with these two walls 84 being connected to each other by partitions 85 at all points identical to partitions 83 and extending longitudinally, like the latter, from one of front walls 79 of reservoir 75 to the other.

Naturally, tubes 80 are sized and configured, notably by appropriate separation from each other by walls 82 and 83 as well as walls 84, so as to offer a transverse passageway cross section suitable to operate as described below.

In addition, walls 84 of two adjacent banks 81, as well as wall 82 of each bank 81 adjacent to lateral wall 77 of the storage reservoir and wall 84 of bank 81 immediately adjacent, are separated from each other so as to maintain spaces 86 between banks 81 that are watertight, except towards the top between front wall 79 and top wall 80, and are for water that will provide the cooling capacity of the reservoir by freezing to ice so that the ice can cool by melting, according to a sequence that will be described now and that can be the function of a program stored in the memory in electronic control 87, which is responsive to sensors 88, such as temperature and humidity sensors in the room or the machine to be supplied with cooled and dehumidified air, timer 89 that takes into consideration the hours when the electrical power supplying fan 57 and compressor 62 is least expensive and/or manual control 90.

FIG. 4 illustrates the configuration of apparatus 47 when it is operating in the mode of making and storing ice in reservoir 75 such as during off-peak hours.

In this mode, dampers 55 and 68 are in positions to fully open main duct 49 inside of duct 48 and downstream opening 53 of bypass 50, while dampers 65 and 72 are in positions to completely close main duct 49 inside duct 48 and auxiliary opening 70 of bypass 50. Compressor 62 is energized so that it circulates low temperature refrigerant through chiller 58, with fan 57 being energized to circulate the air to be cooled and dehumidified and supplied to duct 48 along closed flow loop 91 successively causing the air to flow in direction 51 through controlled closure means 54, fan 57 and chiller 58, where the air is cooled and is transformed into a cooling fluid. The air then flows through downstream opening 53 of bypass duct 50 because dampers 65 are closed. The air then flows through horizontal zone 74 of bypass duct 50, that is, top wall 80 of reservoir 75, in longitudinal direction 92 opposite direction 51. As it passes through storage reservoir 75, the air that was cooled while passing through chiller 58 removes heat from the water in spaces 86 with the consequence that the water freezes. Subsequently, the air exits reservoir 75 having become warmed, then passes through upstream opening 52 into bypass duct 50 to return to fan 57 through dampers 54.

The cooling capacity that has thus accumulated in the form of ice in reservoir 75 can then be used at times outside the off-peak hours, as will now be described with reference to FIG. 5.

In this figure, apparatus 47 is in a configuration where dampers 55 are in position to partially close main duct 49 and inside duct 48 so that the flow of air to be cooled and dehumidified is divided between both main duct 49 and bypass duct 50 as shown schematically at 93, with dampers 72 being in position so that opening 70 is completely unrestricted while dampers 68 completely close opening 53 so that air passing through bypass duct 50 returns to main duct 49 through opening 70, at the urging of fan 57, after having passed through tubes 80 in storage reservoir 75. The air then passes through chiller 58, with dampers 65 completely opening main duct 49 and inside duct 48. Under these conditions, a portion of the air to be cooled and dehumidified flows, in a proportion regulated by the position of dampers 55 that close, to a varying degree, main duct 49 and inside duct 48 and by the action of fan 57, under the control of electronic control 87, through tubes 80 of reservoir 75 in a longitudinal direction 95 opposite to direction 92, where the air is dehumidified and cooled. The remaining portion of the air stays in main duct 49 where it is also subject to the action of fan 57. As it passes through tubes 80, the air to be cooled and dehumidified is cooled, producing water in the form of condensate that is accumulated by suitable drains 94 arranged transversely, approximately horizontally, at the bottom of each of front walls 79 on both sides of lateral walls 77, opening at the outside of bypass 50, like that at the outside of duct 48, for example, and directed to a suitable waste water disposal. The two streams of air to be cooled and dehumidified rejoin at the suction of fan 57, immediately upstream, with respect to direction 51, of chiller 58. The streams can undergo additional cooling in chiller 58, with compressor 62 being operated for this purpose, as controlled by electronic control 87 as a function of demand. The air then continues to flow in main duct 49, as shown schematically by arrow 96 in FIG. 5.

Naturally, as shown in FIG. 6, apparatus 47 can also be made inoperative when dehumidification of the air is unnecessary, as can be determined by sensors 88. Dampers 55 and 65 are then positioned to completely open main duct 49 inside duct 48, while dampers 72 and 68 are completely closed in auxiliary opening 70 and upstream opening 53, so that the air to be cooled, then without dehumidification, does not enter bypass duct 50 but flows through main duct 49, circulation fan 57 and chiller 58, where the air may be cooled by the action of compressor 62, which is started if necessary by electronic control 87.

Apparatus 47 then operates like a conventional cooling and dehumidifying apparatus in which not only cooling but also dehumidification are accomplished by passage through a heat exchanger similar to chiller 58. However, one will easily understand that, for the same amount of cooling capacity, that is, for the same cooling and dehumidifying of air initially having a given temperature and humidity, the use of apparatus 47 under the conditions described with reference to FIGS. 4 and 5, alternately, depending on whether one is in a period of low consumption, where no cooling or dehumidifying of the air is needed, or during a period of low consumption where this need occurs, this permits not only savings in energy costs by not consuming energy except when it is least expensive, but also a reduction in the power and space requirements of refrigeration system 61 in comparison with a refrigeration machine that, without storage reservoir 75, must operate every time there is a demand for cooling and dehumidifying. In addition, when, according to the present invention, dehumidifying is accomplished by passing the air through storage reservoir 75, chiller 58 has only a cooling and no dehumidification function. This allows it to operate at comparatively higher temperatures and refrigeration system 61 to operate under optimum yield conditions.

Naturally, the two applications of the apparatus according to the invention described above constitute only nonlimiting examples. One skilled in the art could develop other applications without departing from the scope of the present invention. Similarly, one skilled in the art could design the storage reservoir, which constitutes one of the characteristics of the present invention, differently. Notably, one could alter the design of the tube banks that effect both the heat exchange between the cooling fluid and the water, causing ice to form, and between the ice and the fluid to be cooled and possibly dehumidified.

We claim:

1. An apparatus for cooling a gas comprising:
   a vapor compression refrigeration system containing a refrigerant and having an evaporator through which said refrigerant may flow;
   a first cooling fluid flow path, in heat exchange relationship with said refrigerant, in said evaporator;
   an ice storage reservoir having an ice storage space within said reservoir,
   a reservoir flow path for gas to be cooled that passes through said reservoir and is in heat exchange relationship with said ice storage space;
   a second cooling fluid flow path between said evaporator and said reservoir, that passes through said reservoir and that is in heat exchange relationship with said ice storage space; and
   a primary flow path for gas to be cooled, separate from said second cooling fluid flow path so that there is no flow communication between said primary flow path and said second cooling fluid flow path, extending through said apparatus from an apparatus gas inlet to an apparatus gas outlet.

2. The apparatus of claim 1 in which said cooling fluid is air.

3. The apparatus of claim 1 in which said gas to be cooled is air.

4. The apparatus of claim 1 in which, within said reservoir, flow in said second cooling fluid flow path is counter to flow in said reservoir flow path for gas to be cooled.

5. The apparatus of claim 1 in which, within said reservoir, flow in said second cooling fluid flow path is cross to air in said flow path for gas to be cooled.

6. The apparatus of claim 1 in which, within said reservoir, said second cooling fluid flow path lies between said ice storage space and said reservoir flow path for gas to be cooled.

7. The apparatus of claim 1 in which said second flow path allows closed recirculating flow of cooling fluid that is separate from said flow of gas to be cooled.

8. The apparatus of claim 7 in which a fan causes fluid to flow in said closed recirculating flow between said evaporator and said reservoir.

9. The apparatus of claim 1 in which all said gas passing through said primary flow path for gas to be cooled through said apparatus passes through said reservoir flow path for gas to be cooled.

10. The apparatus of claim 1 further comprising drainage means, in fluid flow communication with said flow paths for gas to be cooled, for removing water that may condense from said gas to be cooled and collect in said flow paths for gas to be cooled.

11. The apparatus of claim 1 in which, within said reservoir, said second cooling fluid flow path and said reservoir flow path for gas to be cooled are combined, there being but a single fluid flow path through said reservoir.

12. The apparatus of claim 1 in which flow in said single fluid flow path through said reservoir is in a first direction during operation in one mode of operation of said apparatus and in a second direction during operation in another mode of operation of said apparatus.

13. The apparatus of claim 12 further comprising:
a bypass flow path having a first opening into said primary flow path,
a second opening into said primary flow path located downstream, in flow relationship from said first opening and
a third opening into said primary flow path located downstream, in flow relationship from said second opening;
first damper means for controlling flow in said primary flow path located downstream, in flow relationship, from said first opening and upstream, in flow relationship from said second opening;
second damper means for controlling flow in said primary flow path located downstream, in flow relationship from said third opening;
third damper means for controlling flow through said third opening;
fourth damper means for controlling flow through said second opening;
a primary fan for causing a flow of gas in said primary flow path located in said primary flow path downstream, in flow relationship from said second opening, and upstream, in flow relationship, from said third opening; and
in which:
said bypass flow path includes said single flow path through said reservoir; and
said evaporator is located in said primary flow path downstream, in flow relationship, from said primary flow fan and upstream, in flow relationship, from said third opening.

14. The apparatus of claim 13 further comprising drainage means, in fluid flow communication with said flow path for gas to be cooled, for removing water that may condense from said gas to be cooled and collect in said flow path for gas to be cooled through said reservoir.

15. The apparatus of claim 13 in which said apparatus has
a first operating mode, its ice freezing mode, in which:
said first damper means is positioned to allow a full flow of gas;
said second damper means is positioned to prevent flow of gas;
said third damper means is positioned to allow a full flow of gas; and
said fourth damper means is positioned to prevent flow;
so that cooling fluid recirculates from the discharge of said primary fan, then through said evaporator, then through that portion of said primary air flow path that is between said evaporator and said second damper means, then through said third opening, then through that portion of said bypass flow path that is between said third opening and said reservoir, then through said single flow path through said reservoir, then through that portion of said bypass flow path that between said reservoir and said first opening, then through said first opening, then through that portion of said primary flow path and said primary fan to the suction of said primary fan, with no gas exiting said apparatus gas outlet;
a second operating mode, its air cooling by stored ice mode, in which:
said first damper means is positioned to allow less than a full flow of gas;
said second damper means is positioned to allow a full flow of gas;
said third damper means is positioned to prevent flow; and
said fourth damper means is positioned to allow a full flow of gas;
so that gas to be cooled flows from said apparatus gas inlet to said apparatus gas outlet, with a first portion, as determined by the position of said first damper means, of said gas to be cooled flowing from said apparatus gas inlet, then through first damper means, then through said primary fan, then through said evaporator, then through said second damper means to said apparatus gas outlet and a second portion of said gas to be cooled flowing out of said primary air flow path into said bypass flow path through said first opening, then through said single flow path through said reservoir, then out of said bypass flow path through said third opening to rejoin said first portion before exiting said apparatus gas outlet; and
a third operating mode, its ventilating or cooling by evaporator mode, in which:
said first and second damper means are positioned to allow full flow; and
said third and fourth damper means are positioned to prevent flow;
so that gas to be cooled flows from said apparatus gas inlet through said primary flow path, passing through said primary fan and said evaporator, to said apparatus gas outlet, with there being no flow through said bypass flow path.

* * * * *